United States Patent [19]

Lefebvre

[11] 4,170,906
[45] Oct. 16, 1979

[54] WIRE SKINNING MACHINE

[75] Inventor: Jean P. Lefebvre, St. Hubert, Canada

[73] Assignee: Northern Telecom Limited, Montreal, Canada

[21] Appl. No.: 847,414

[22] Filed: Oct. 31, 1977

[51] Int. Cl.² ............................................. H02G 1/12
[52] U.S. Cl. ..................................................... 81/9.51
[58] Field of Search .............................. 81/9.5 A, 9.51

[56] References Cited

U.S. PATENT DOCUMENTS

| | | | |
|---|---|---|---|
| 3,309,948 | 3/1967 | Falken | 81/9.51 |
| 3,782,227 | 1/1974 | Veenendaal | 81/9.51 |
| 3,817,127 | 6/1974 | Soeller | 81/9.51 |
| 3,832,767 | 9/1974 | Petree | 81/9.51 X |
| 3,916,733 | 11/1975 | Meadows | 81/9.51 |
| 3,922,934 | 12/1975 | Hiatt | 81/9.51 |

*Primary Examiner*—James G. Smith
*Attorney, Agent, or Firm*—Sidney T. Jelly

[57] ABSTRACT

This invention provides a wire skinning machine for skinning the insulation of inner conductors of multi-wire cables. A machine embodying the invention has three main advantages. First of all uniformity. The use of the invention ensures that all cables and wires are cut and skinned uniformly. Secondly there are two speed advantages one that the machine can prepare more skinned wires of a single cable more accurately and in less time than manually and that the machine is able to handle a large number of cables at one time. To do this the invention provides in combination a means for clamping multi-wire cables a means for fanning the inner conductors into a single layer in approximately parallel relationship, means for cutting the conductors to length and means for cutting the plastic insulation surrounding individual conductors and finally further means for sliding the cut end portion of the insulation off the inner metallic core.

10 Claims, 7 Drawing Figures

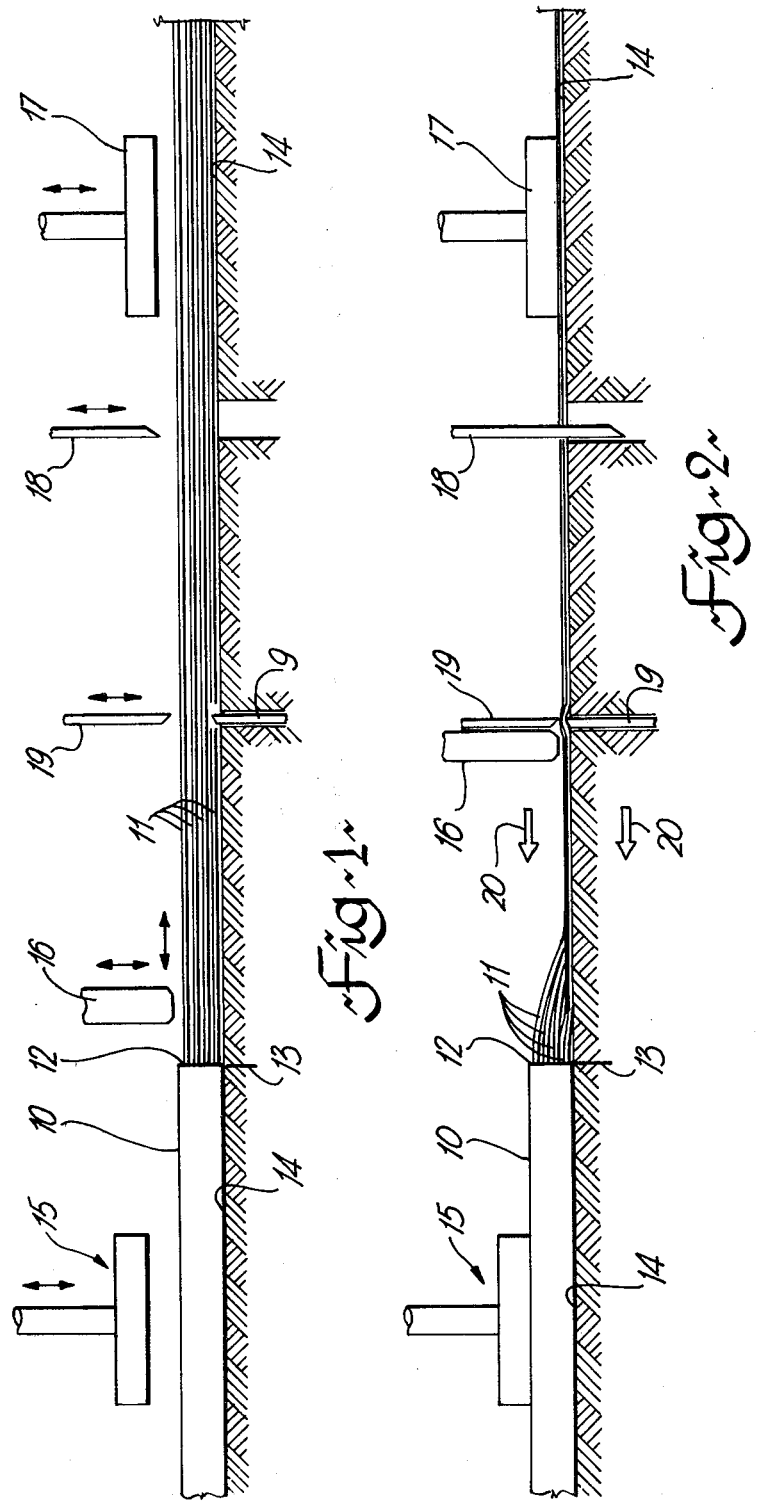

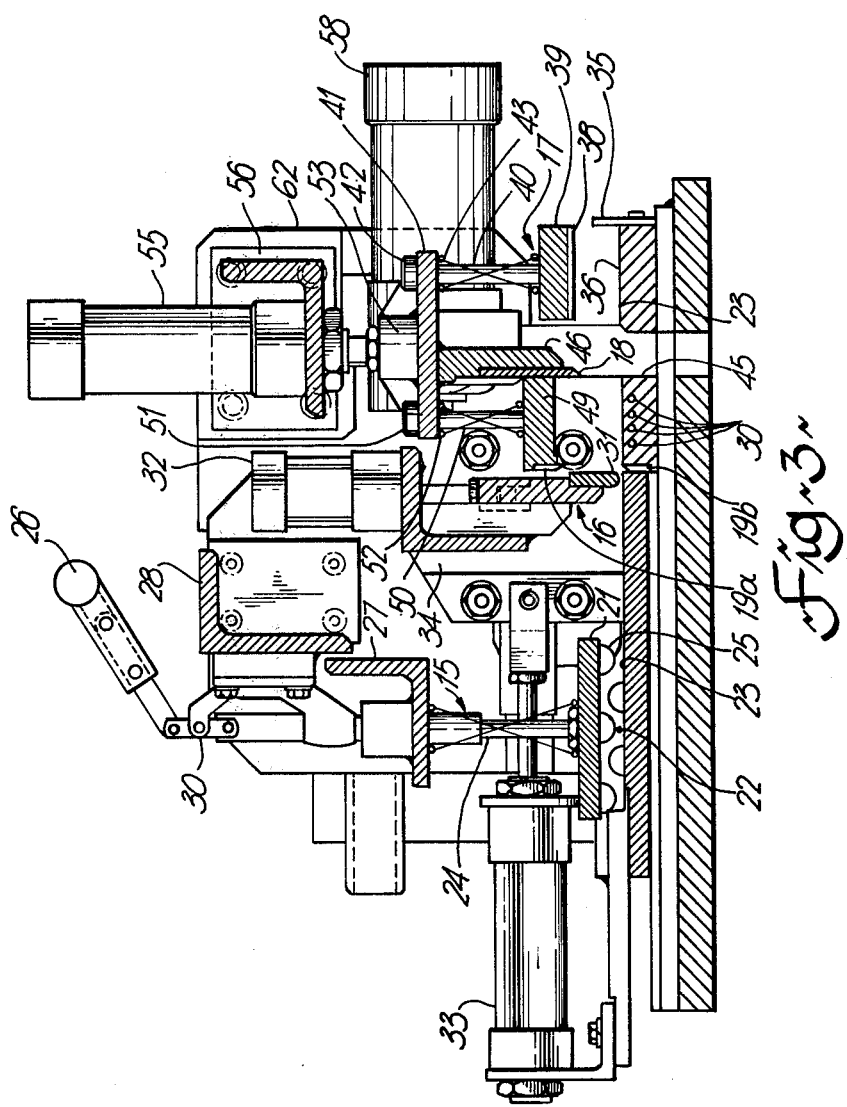

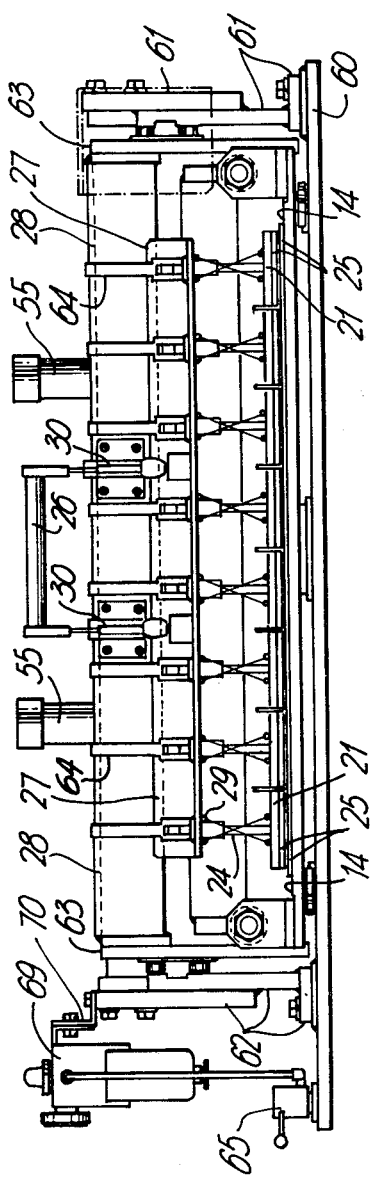
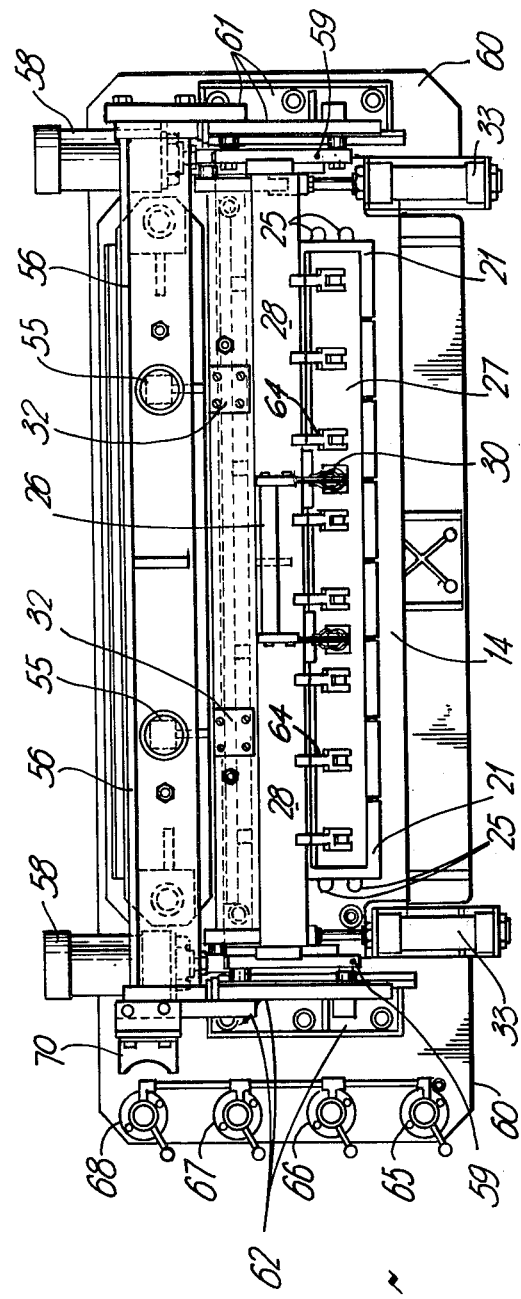

WIRE SKINNING MACHINE

FIELD OF THE INVENTION

This invention relates to devices for removing the plastic insulation from individual conductors in multi-wire cables and more particularly to a machine for automatically skinning the insulation from individual conductors in a plurality of cables at one time.

BACKGROUND OF THE INVENTION

In telecommunication systems and particularly the telephone network there are many wires and cables connected to all manner of equipment. For example a switchboard may have hundreds of individual wires connected to it, the individual wires making up various cables.

The cables generally comprise an outer sheath of flexible plastic material and a number of individually insulated inner conductors. A butted cable is one where the outer sheath has been removed from the cable for a portion of its length from one end. The butt of the cable is that portion where the outer sheath stops.

In order to facilitate wiring a switchboard or other telecommunications equipment it is desirable to have all the cables and wires skinned ready for connection beforehand. The job of skinning cables and wires of their insulation manually is a tedius, time consuming and frustrating chore especially on cables as large as 36 pair of conductors. Other drawbacks of the manual system are the large possibility of errors such as nicking the inner conductors causing a weak area. As well it is most likely that the skinned portions will not be of uniform length.

The operation of the wire skinning machine can be considered as a series of operations. The first operation is the clamping of the butted cable to the work surface. The butt of the cable is placed next to a positioning mark on the work surface. The clamp is comprised of a moveable clamping member that presses down on the cable.

The inner conductors are fanned into a single layer by a member which has a wiping action starting at a position towards the butt of the cable and wiping toward the loose ends. The fanned ends of the wires are clamped to prevent moving during subsequent operations.

The wires are cut to length using a shearing blade. The insulation is then cut by opposed cutting blades, one moveable and one fixed. The depth of the cut made by the insulating cutting blades is such that the inner metallic conductors are not damaged.

The cut insulation is then slid off the inner metallic conductors by relative movement between the moveable clamping member which clamps the butt and the insulation cutting blades.

STATEMENT OF THE INVENTION

The invention provides in combination a clamping means for clamping multi-wire cables, a means for fanning the inner conductors into a single layer in approximately parallel relationship, means for cutting the conductors to length and means for cutting the plastic insulation surrounding individual conductors and further means for sliding the cut end portion of the insulation off the inner metallic core.

The advantages of the invention are first of all uniformity. The use of the invention ensures that all cables and wires are cut and skinned uniformly. Secondly, speed is an advantage, in that the operation of a machine embodying the invention can prepare more skinned wires of a single cable more accurately and in less time than manually. Thirdly a second speed advantage is achieved by the machine being able to handle a large number of cables at one time.

An example embodiment of the invention will now be described in conjunction with the drawings in which:

FIG. 1 is a diagrammatic cross-section in which the elements are in the unoperated position;

FIG. 2 is similar to FIG. 1, but in the operated position;

FIG. 3 is a cross-section of the machine;

FIG. 4 is a front view of the machine;

FIG. 5 is a plan view of the machine;

FIG. 6 illustrates in cross-section an alternative arrangement for the blade support in which a comb-like member is attached;

FIG. 7 illustrates the arrangement of FIG. 6 in a front view.

As illustrated in FIGS. 1 and 2, a butted cable 10 is placed into a machine such that the butt 12 of the cable is inserted to a predetermined point at 13. The wire ends extend at least the length of the work surface 14. FIG. 1 shows the rest position of the various parts and FIG. 2 shows the operated positions. Cable 10 is clamped into place by actuation of the clamping means 15.

The wires 11 are fanned into a single layer by a wiping action from wiping member 16. Once fanned, the wires 11 are clamped in that form by pressure head 17. Shearing blade 18 cuts wires 11 to final length. Skinning blades 19 cut into the insulation of wires 11 from above and below. While the skinning blades 19, still extend into the insulation, the clamping means 15 and wiping member 16 move away from the skinning blade 19 in the direction shown by arrows 20, sliding the insulation off the wires 11. Clamping member 15 and pressure head 17 release and blades 16, 18 and 19 return to their rest position finishing the operation.

As illustrated in FIG. 3, the cable clamping means 15 comprises a moveable clamping member 21, a clamping area 22 on work surface 14. Clamping member 21 is mounted on a shaft 24. Ribs 25 of resilient material are attached to clamping member 21 and clamping area 22, thus as an example, three of the ribs 25 are fixed to clamping member 21 and two of said ribs 25 are fixed to clamping surface 22 normal to the axis of the cable. The ribs 25 are affixed in offset opposition. The use of said ribs 25 allows a reduction in the clamping pressure needed to hold the cables securely as compared to clamping without said ribs and ensures the inner conductors 11 of the cables 10 are not damaged.

Each of the cables 10 is initially held in place on work surface 14 while the remaining cables are being inserted, by means of a pre-clamping lever 64, shown in FIGS. 4 and 5. First shaft or rod 24 is slidably mounted through bracket 27 and supported therein by ring 24a which is fixed, as by welding, to bracket 27. Attached to the end of the first shaft or rod 24 is the pre-clamping lever 64. In the operated position, pre-clamping lever 64 applies a pressure to shaft or rod 24 which in turn forces clamping member 21 onto the cable holding it in place. Pre-clamping lever 64 is generally operated manually.

Once all the cables are held in place a final clamping means is actuated. Handle 26 operates lever assembly 30 which forces bracket 27 down, which in turn applies clamping pressure on each clamping member 21 by means of springs 29 surrounding shafts or rods 24.

In order to be able to skin all the wires of a cable at one time it is necessary to have them all lie in the same plane. However, in a cable, the wires are not all in the plane but are rather in a circular area in cross-section. To get the wires into a single plane, a wiping member 16 fans the leads using a wiping motion that takes the form of a straight line slope or an arcuate slope starting at or near the cable butt.

This action is achieved by first and second actuators 32 and 33. First actuator 32 acts in a line perpendicular to the axis of the cable and from above it. Second actuator 33 acts in a line parallel to the axis of the cable and above it. Second actuator 33 moves a carriage 34 on which the first actuator 32 is mounted to obtain the movement of the wiping member 31 in two dimensions.

In the example illustrated, an actuator comprises a piston and cylinder and a means to move that piston back and forth along the piston's major axis. The means to move such a piston may be pneumatic as illustrated, hydraulic, electric motors or manual means.

A comb 35 is provided to restrict the fanout of the wires 11 to approximately the width of one layer of wires 11, of a cable 10. The comb 35 is located adjacent to the end of pressure surface 36. The outer ends of fanned wires are held in place on pressure surface 36 by pressure head 17. Pressure head 17 comprises a resilient surface 38 and a backplate 39 mounted on a shaft or rod 40, slidably affixed to guide plate 41. A collar 42 is mounted on the end of the second shaft or rod 40 to limit the sliding travel. Pressure is applied from guide plate 41 to pressure head 17 by spring 43 surrounding shaft or rod 40.

Shearing blade 18 acts in relation with a shearing surface 45. Shearing blade 44 is mounted on blade support 46 which in turn is mounted on guide plate 41.

A first skinning blade 19b is located in the work surface 23 and protruding therefrom by an amount corresponding to the depth of cut required. A second skinning blade 19a is slidably mounted on plate 49. Plate 49 is mounted on a third shaft or rod 50, a collar 51 is mounted on the end of third shaft or rod 50 to limit the sliding travel.

Pressure is applied from guide plate 41 to plate 49 and then to skinning blade 19a by means of spring 52 surrounding third shaft or rod 50.

Attached as by welding to guide plate 41 is block 53 which is threaded to accept a fourth shaft or rod 54 from third actuator means 55. Third actuator means 55 is supported by bracket 56. Bracket 56 is mounted on support member 62.

As illustrated in FIG. 4 the machine embodying the invention is supported on base plate 60 by common support members 61 and 62, one at each outer end of the machine. Mounted on the base plate is work surface 14. Inner support 63 supports bracket 28 and the ends of work surfaces 14. Bracket 28 in turn supports handle 26 and lever assembly 30 which is connected to bracket 27. Pre-clamping levers 64 are mounted one each on the ends of first shafts or rods 24.

Fourth actuator means 58 acts on sliding assembly 59 which is supported by end supports 61. Sliding assembly 59 supports clamping means 15, the wiping member 16 and related assembly. Actuation of actuator 58 slides the clamping means 15, and the wiping member 16 in a direction parallel to the axis of the cable and away from the skinning blades 19. This action slides the insulating coating off inner conductors 11.

Actuator means 32, 33, 55 and 58 are operated respectively by pneumatic valves 65, 66, 67 and 68 and are mounted on the base plate 60. Air regulator 69 supplies the necessary air for the said pneumatic valves. Air regulator 69 is mounted on common support 62 by bracket 70.

It may be desirable to expose less of the inner conductors than hereinbefore discussed. If this is the case the inner conductors should be cut so that when placed on the work surface with the butt at the proper spot they extend just past the shearing blade. In this case pressure head 17 and comb 35 are not used and may be removed. This alternative has the advantage of a saving in the amount of wire wasted.

A further modification to ensure ease of skinning can be added. This modification comprises a heating element 30 embedded into the work surface 23 near the skinning blades 19. Such a heating element warms the wires which makes skinning easier. Cables that are delivered in winter and stored in cold areas are much harder to skin than warm ones. Also certain manufacturers make wires and cables whose insulation is generally harder than others, heating of these makes the skinning easier.

An alternative arrangement for ensuring that the wires lay flat and uncrossed in addition to the fanning member 16 is shown in FIGS. 6 and 7. A comb-like member 80 is attached by a spring loaded hinge 81 to the bottom of skinning blade support 49.

On the downward motion of the skinning blade support 49 and the comb-like member 80 combs the wires as member 80 swings up, thus ensuring that the wires lie flat and side-by-side.

What is claimed is:

1. For a cable comprising a plastic outer sheath and a number of inner conductors each insulated one from the other with a plastic coating, said cable having an axis along the length of the cable, a machine for skinning said insulating coating from ends of said inner conductors comprising in combination;

a base plate and a pair of support members mounted on said base plate, a support member at each end of said base plate;

said base plate including a plane work surface area disposed centrally on said base plate;

means for clamping said cable to including a ribbed clamping surface forming part of said plane work surface and a ribbed clamping member slidably supported on and positioned between said support members, in opposition one to the other and extending transversely to the cable length, the ribs of said clamping surface and said clamping member offset to provide a serpentine clamping area;

a fanning member for fanning said inner conductors into a single layer of conductors disposed in approximately parallel relationship on said plane work surface and parallel to said axis of said cable, said fanning member slidably supported on said base plate;

shearing members for shearing the inner conductors to a desired length and comprising a first shearing member mounted on said base plate and a second shearing member slidably supported between said support members for movement towards said first shearing member;

cutting members for cutting into said insulating coating at a predetermined distance from said ends to define end portions of said insulating coating and comprising a first cutting member mounted on said base plate and a second cutting member slidably supported between said support members for movement towards said first cutting member;

means for moving said clamping means relative to said cutting members to slide said end portions of insulating coating from said inner conductors in a direction parallel to said plane work surface along a line parallel to the axis of said cable.

2. A machine as clamed in claim 1, said clamping means further comprises a first shaft, a first bracket and a pre-clamping lever wherein said clamping member is connected to said first shaft, said first shaft slidably mounted through said bracket;

said first shaft having an end remote from said clamping member;

said end connected to said pre-clamping lever and adapted to apply force on said first shaft along its axis to provide pre-clamping.

3. A machine as claimed in claim 2, wherein a handle and lever assembly is attached to said first bracket and to a second bracket, said second bracket slidably mounted between said support members;

said lever assembly being adapted to provide final clamping action by applying force between said second bracket and said first bracket which is transferred to said clamping member by means of a spring surrounding said first shaft.

4. A machine as claimed in claim 1, said fanning member comprising a wiping member mounted on a support, a first actuator connected to said support, for movement normal to said plane of said work surface, a carriage supporting said first actuator and said wiping member and adapted for movement parallel to said axis of said cable, and a second actuator means connected to said carriage, said second actuator mounted on said base plate.

5. A machine as claimed in claim 4, wherein said actuators may be one of electrical, pneumatic, hydraulic and manual.

6. A machine as claimed in claim 1, said member for shearing said inner conductors to length comprising:
a pressure head for holding the ends of said inner conductors in a fanned condition;
a shearing surface and a shearing blade;
said pressure head including a layer of resilient material;
said pressure head further including a second shaft and a guide plate, said shaft slidably mounted in said guide plate;
said second shaft having first and second ends, said first end connected to said resilient material and a collar at said second end to restrict movement of said second shaft and retain said second shaft in said guide plate;
a compression spring between said guide plate and said first end;
said shearing surface comprising a surface normal to and below the axis of said cable;
a support, said support rigidly fixed to said guide plate;
said guide plate connected to a third actuator mounted between said support members.

7. A machine as claimed in claim 1, said cutting members for cutting into said insulating coating comprising:
a blade support and a first blade mounted on said blade support, and a third shaft mounted on said blade support, said shaft slidably mounted on a guide plate;
said third shaft including an end remote from said blade support, and a collar at said remote end and restricting shaft movement, and a compression spring extending between said guide plate and said blade support;
said guide plate exerting pressure on said blade support and thence on said first blade by means of said spring;
a second blade opposed to said first blade and attached to said work surface, protruding above said work surface an amount corresponding to the desired depth of cut;
said guide plate connected to a third actuator mounted between said support members.

8. A machine as claimed in claim 7 including a comb-like member hingedly attached to said blade support, said comb-like member including a free end which rests on said work surface, said free end adapted to comb said inner conductors into a flat parallel relationship during the downward movement of said blade support.

9. A machine as claimed in claim 7, including a heating element embedded in said work surface near said second blade and capable of heating said work surface and said inner conductors.

10. A machine as claimed in claim 1, said means for moving said clamping means relative to said cutting members comprising slidable supports adapted for movement parallel to the axis of said cable, and a fourth actuator means;

said clamping means for clamping said cable into said machines and said fanning member for fanning said conductors both mounted on said slidable support;

said slidable support connected to said fourth actuator means;

said fourth actuator mounted between said support members.

* * * * *